(No Model.)  5 Sheets—Sheet 1.

E. B. IVES.
TELEGRAPHY.

No. 442,267.  Patented Dec. 9, 1890.

Attest
W. Benjamin
Frank B. Pierdon.

Inventor:
Edward B. Ives
by A.G.N.Vermilye
his attorney.

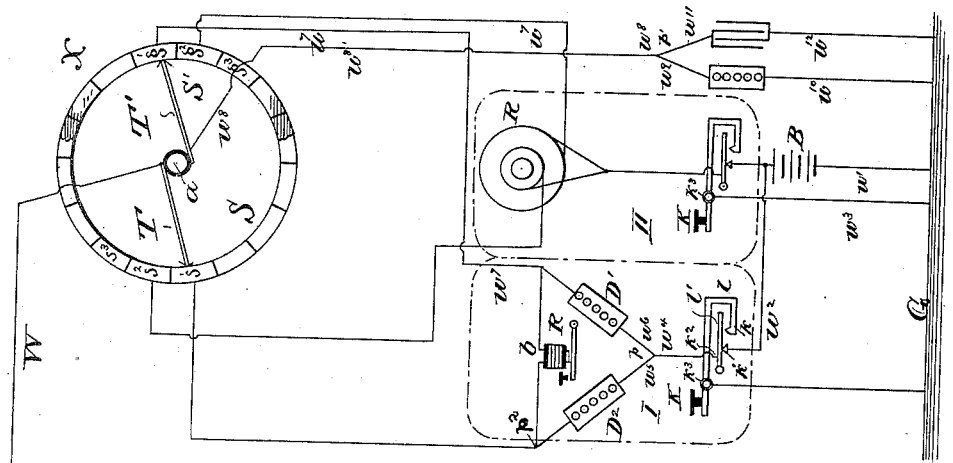

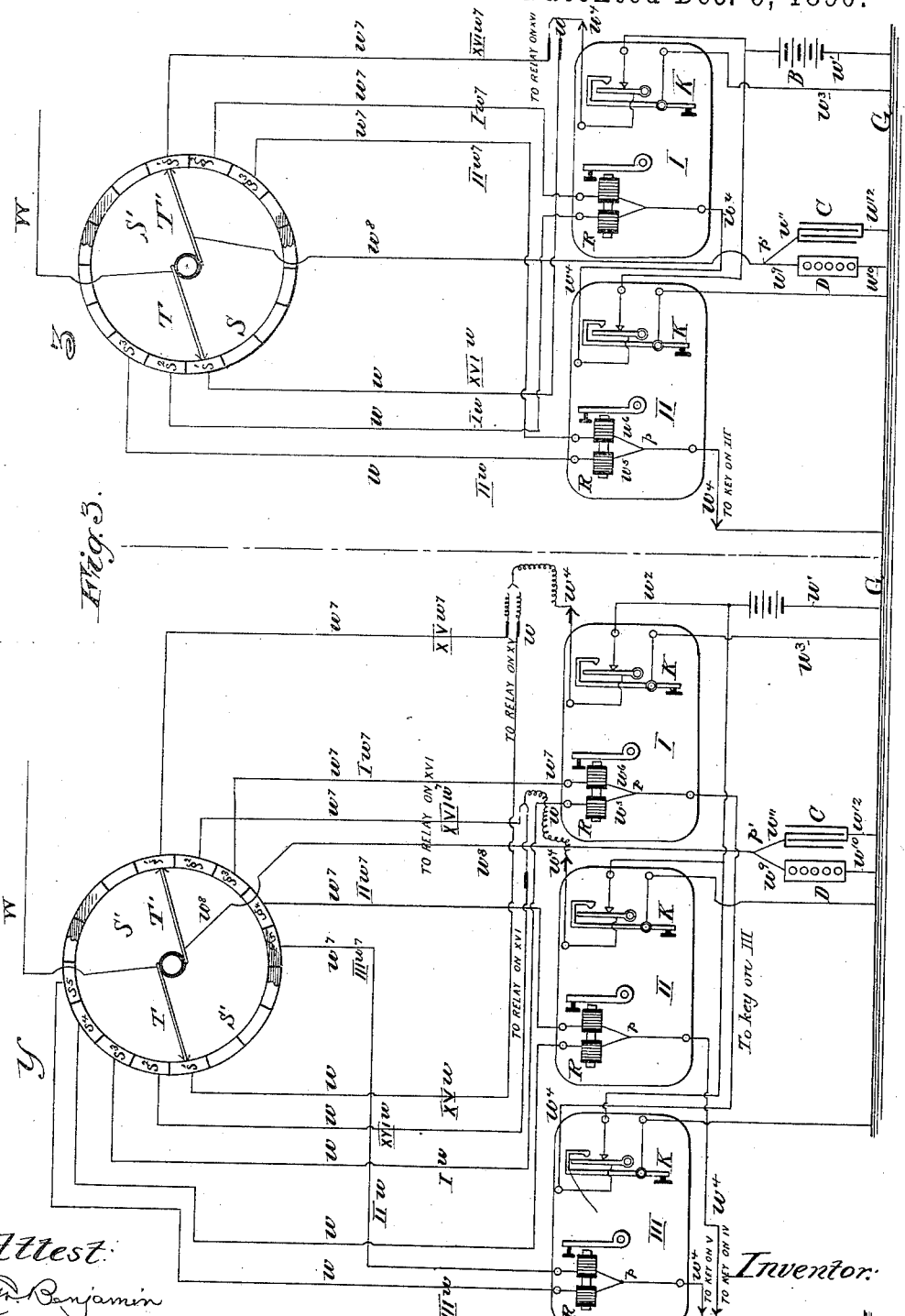

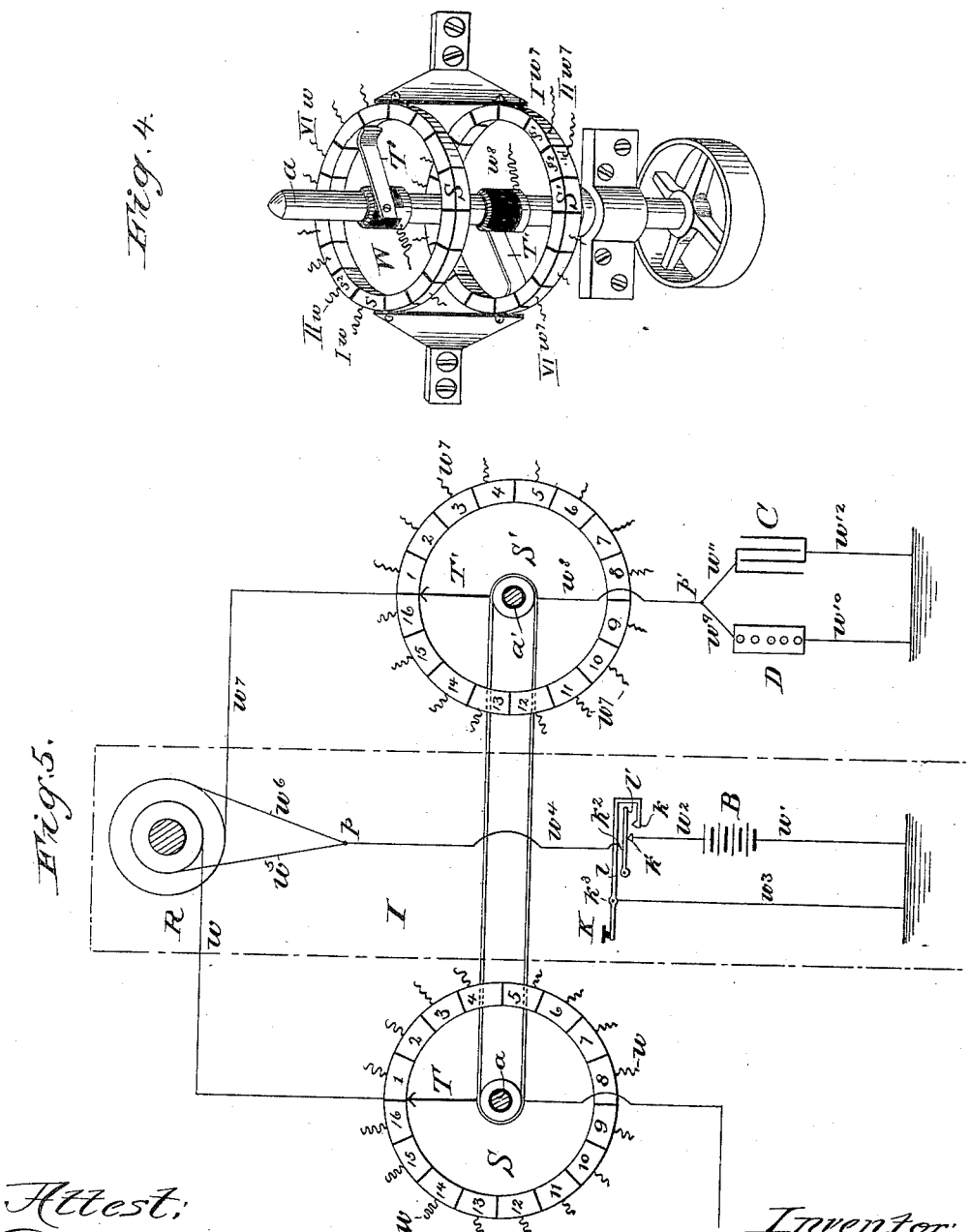

(No Model.) 5 Sheets—Sheet 5.

E. B. IVES.
TELEGRAPHY.

No. 442,267. Patented Dec. 9, 1890.

Attest
C. W. Benjamin
Frank B. Pierdon.

Inventor:
Edward B Ives.
by A. G. N. Vermilye
his attorney

UNITED STATES PATENT OFFICE.

EDWARD B. IVES, OF NEW YORK, N. Y., ASSIGNOR TO JAMES M. SEYMOUR, OF SAME PLACE.

TELEGRAPHY.

SPECIFICATION forming part of Letters Patent No. 442,267, dated December 9, 1890.

Application filed February 24, 1890. Serial No. 341,427. (No model.)

*To all whom it may concern:*

Be it known that I, EDWARD B. IVES, a citizen of the United States, and a resident of New York, in the county of New York and State of New York, have invented certain new and useful Improvements in Telegraphy, of which the following is a specification, reference being had to the accompanying drawings, forming a part of the same, in which—

Figure 1:
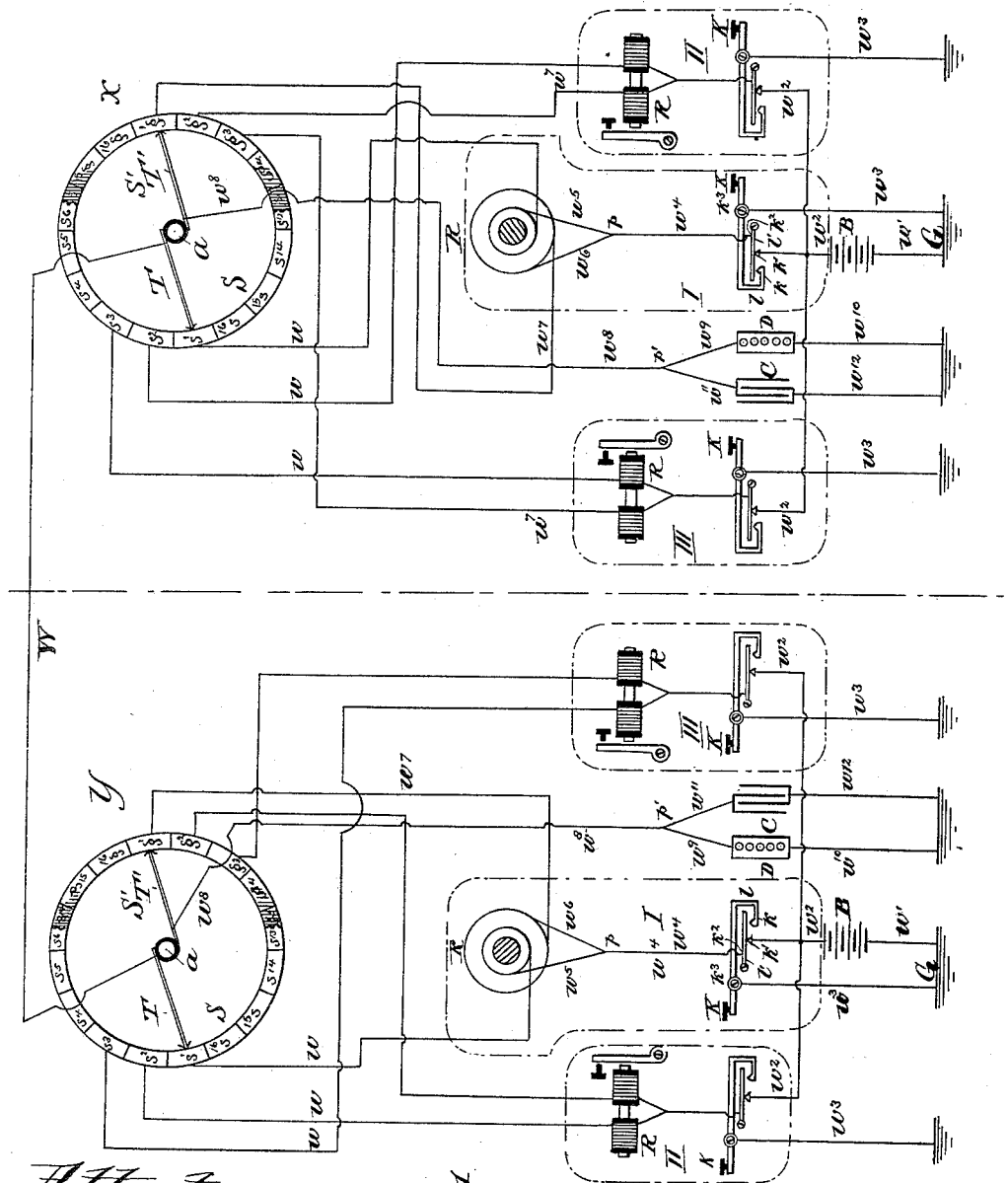
Figure 6:
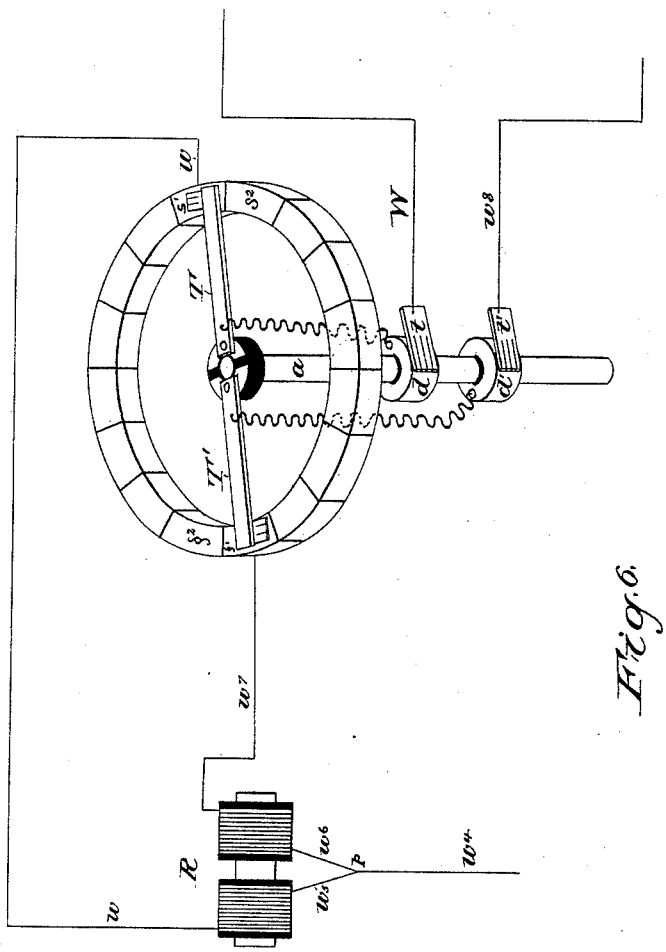

Figure 1 is a plan view of a system embodying the main features of my invention. Fig. 2 is a similar view showing two stations of such a system and exhibiting two different forms of apparatus for the simultaneous transmission of electrical signals in opposite directions over a single wire. Fig. 3 represents a modified arrangement of the instruments by means of which certain new and useful results are attained. Fig. 4 is a detail view of one form of circuit-breaker employed in such a system, and Figs. 5 and 6 represent modified arrangements of circuit-breakers for breaking and closing the main and artificial line circuits.

My invention relates to multiple telegraphy; and it consists in the devices and combinations of devices hereinafter described and claimed, whereby I am enabled to simultaneously transmit signals in opposite directions over a single wire, between which and the instruments there is interposed a circuit-breaker, one part of which is sectional and has its several sections respectively connected to the respective instruments, thereby securing the beneficial results of a multiplication of circuits in both directions and certain other advantages as well.

In the drawings, X represents one station, and Y another. Between them extends the main-line conductor W.

The letters $x$ and $y$ and the divisional numbers I, II, &c., will be sometimes placed before other letters to indicate a certain part at a certain station or division.

At X and Y conductor W is electrically connected to T, one of the contact devices composing the circuit-breaker. T is preferably mounted on a shaft $a$, all of said shafts at the respective stations being arranged to rotate as nearly synchronously as possible.

S is the sectional contact device, shown in the form of an annulus composed of sections insulated from each other, though the present invention is not limited to any one form or arrangement of contact devices, as instead of an annulus divided into sections a part extending in right lines might be used, and instead of moving trailer T by shaft $a$ we might move contact S. From each section $s\ s'$, &c., of contact S separate wires $w$ extend to ground, but not directly. Thus it will be perceived that if the trailers T of different stations be started at the same relative point of contacts S and revolved synchronously and in the same direction, as many different circuits (in sequence) will be established as there are sections, one from ground at Y to $ys'\ yT\ W\ xT\ xs'$ and ground at X, another ground at Y $ys^2\ yT\ W\ xT\ xs^2$, ground at X, &c., and that if the movement is rapid these several circuits would practically exist at all times and the capacity of W be greatly multiplied, for, theoretically, the number of sections might be indefinitely increased. Actually, however, there is a limit to the number of sections that may be conveniently used, and to increase the capacity of the line beyond that point and for other reasons I have devised the system herein set forth.

As stated, the wires $w$ do not extend directly to ground, nor do they merely include in their circuit a relay or sounder and key, but each is connected to the following instruments: a relay R, provided with two separate coils, so arranged that when equal currents pass through them they will exert an equal magnetic effect upon their cores, and thereby neutralize each other, a battery B, one pole of which (here the negative) is connected to the earth by wire $w'$, and the other by $w^2$ to the contact or anvil $k'$, with which the supplementary contact-lever $l'$ of key K is normally kept in contact by a spring. Lever $l$ at $k^3$ is connected directly to earth by $w^3$, while the lever $l'$ at $k^2$ is attached to wire $w^4$, which branches at point $p$ into wires $w^5$ and $w^6$, the first going to the right-hand coil of relay R, and by it is connected to $w$, while the other is connected to the left-hand coil, and by it to wire $w^7$, which extends to a section §' of a second sectional wheel or annulus S', and provided with a trailer T', supported on $a$, and connected to wire $w^8$, as shown in Fig. 1, which is intended to represent S and S', one above the other, with a part of S broken away to show S', a resistance D and condenser C being interposed in the extensions of line $w^8$, which branches at $p$, into $w^9$ and $w^{11}$, and connected to ground by $w^{10}$ and $w^{12}$, all so adjusted that the resistance and static capacity of this last-named circuit from relay to ground (the artificial line) shall equal that of the main line added to that of one wire of the relay at the other station. Then the current from the main battery B, through circuit $w^2 k' l' w^4$, will divide at $p$, one portion going through one coil of the home relay by way of wire $w^6$, and by wire $w^7$, section §', trailer T', wire $w^8$, and the continued artificial line to ground. The other portion tends to go from $p$ to the main line by way of $w^5$, the other coil of the relay R, wire $w$, section $s'$, and trailer T; but as it meets the current from the other station of opposing polarity the current in the main line is neutralized or becomes null. The current in the artificial line being therefore unopposed by the line-current charges its coil of the relay, which condition of affairs continues so long as neither key is operated. If now the key $y$K is depressed, the contact $k$ will bear against $l'$, thus closing another circuit from ground to $w^4$ by way of wire $w^3$, lever $l$ at $k^3$, $k$, and lever $l'$, and then lifting $l'$ from $k'$ will break the circuit of battery $y$B. The line-current from $x$B, no longer opposed by that from $y$B, but still having its circuit complete from W to ground through T, $ys'$, $yw$, R, $yw^5$, $yw^4$, $l'$, $k$, $l$, and $w^3$ charges its coil of $y$R with a current of similar polarity to that theretofore charging the opposite coil and no response is made to the manipulation of $y$K. At X, however, its line-current, as just explained, being no longer neutralized by that from Y, charges the main-line coil of $x$R, and neutralizes the charge of the artificial-line coil of $x$R, and its armature, no longer affected by any current through the relay, responds to the action of key $y$K. The relay at Y would in like manner respond to the movement of key $x$K, while $x$R, for the reasons given above, would not. If both keys are depressed at the same instant, all current is cut off and a response is made at each relay. Thus it will be seen that each station in effect receives its signal through the action of the distant battery, and that I not only derive the benefit arising from the multiplication of the capacity of the line-conductor W by the number of the segmental contacts, each making a circuit, but I also multiply that product by increasing the capacity of each circuit through the segmental contacts.

Instead of employing the apparatus just described, I may use one modified as shown at division I, Fig. 2, (the divisional numbers being used to denote the respective sets of instruments and wires of the circuits through the respective segments of the contact.) In this form of apparatus the main battery has its respective poles connected, as before described, to ground by $w'$, and to lever $l'$ by $w^2$ and anvil $k'$. When K is depressed, the battery is cut off from the line by the breaking of contact between $k'$ and $l'$; but when in a state of rest, the current goes to the line. The artificial resistances D, D', D², and the line W, connected as shown, constitute a balance. The receiving-instrument R is placed in a bridge-wire $b$. It is obvious, therefore, that if the resistances are adjusted in the following proportions: $D^2 : D' :: W : D$, (preferably all equal,) neglecting the resistance of the earth, which is usually too small to affect the result, the bridge-wire $b$ will be neutral as to any current entering the system at the point $p$. Consequently the outgoing currents, which pass into the line when K is at rest will produce no effect whatever upon the instrument in the bridge-wire, assuming that only the battery at the home station is in circuit; but that is not the case. That part of the current which tends to go to the main line, as before explained, is neutralized by the opposing current of the battery at the distant station, the result being that the balance is destroyed, and the relay R is charged so long as keys K are in a state of rest. If the key at the distant station is depressed, its current is wholly cut off, the balance mentioned is at once restored, and wire $b$ at the home station becomes neutral, with a corresponding action at the relay, which thus responds to the movement of the key at the distant station. On the other hand, if the home-key is depressed, cutting off the current from the home battery, no movement is thereby caused at the home relay as the current from the distant battery (no longer opposed) incoming from W, over T, $s'$, and $w$ will divide at $p^2$, part going through $b$, relay R, wire $w^7$, §', T', $w^8$, and the continued artificial line to ground, and the remainder by way of $w^5$, D², $w^4$, $l'$, $k$, $l$, and $w^3$ to earth. R is still charged and no movement of its parts occurs, the result being that the relay responds only to the manipulation of the distant key, as in the other form of apparatus.

Each of the forms of apparatus above described, and indeed any apparatus employing a series of contact-pieces traversed by or traversing a contact-point to close multiple circuits through one main conductor, is still liable to the derangement, delay, and annoyance caused by retardation. That is to say, if $x$T and $y$T were moving in perfect synchronism, yet upon some lines the retardation of the signal is so great that while $y$T might be at the nearest extremity of $ys'$, when the key was operated to send a signal from Y to X, yet when the signal was received at X, $x$T would have reached the farthest extremity of $xs'$, and before the manipulation of $x$K could have caused a return impulse to affect the relay $y$R, $y$T would have passed wholly off of $ys'$ and the operator at instruments I would not receive said return-signal at all; but the impulse would actuate the relay of set II or III, and to avoid the resultant difficulties I have devised the arrangement of apparatus shown in Fig. 3, in which the connections, batteries, resistances, &c., of the stations shown are substantially similar to those heretofore described, the instruments of only three sections at Y and two at Z being shown. Instead, however, of having the relay and key, which are connected to $ys'$, located together under the control of the operator at I in charge of that division, I place the transmitter or key which is in the circuit from section $ys'$ upon the same table with and adjacent to the relay or receiving instrument, which is in the circuit from section $ys^3$, these two instruments being thus in one division and controlled by the operator at I, the key of $ys^2$ and relay of $ys^4$ at II, key of $ys^3$ and relay of $ys^6$ at III, &c., having ascertained by actual test that $yT$ at its usual rate of speed will pass from $s'$ to $s^3$ in twice the time occupied by an impulse sent from Y in reaching X, and that therefore the relay of section $ys^3$ is the receiving-instrument most likely to announce the return-signal of the operator at division I, station X, to the operator at division I, station Y. If at some other station—say Z—the retardation is not the same as at Y, but such that in the interval mentioned $zT$ would only move from $s'$ to $s^2$, then I combine as follows: the key of $zs'$ and relay of $zs^2$, key of $zs^2$ and relay of $zs^3$, &c., the rule being to combine with a given key the receiving-instrument connected with that section to which the contact will have moved (from the section electrically connected with the given key) in twice the time occupied by an electrical impulse in reaching the distant station, or the time occupied in the transmission of a signal from one station to the other and back. There is thus preserved between the instruments of each operator an interval equal, as it were, to the retardation of the line. They therefore together make a complete system for his use, and he is not annoyed by having his receiving-instrument respond to signals from an operator of another division and the signals intended for him received by some other operator. It is not necessary for the accomplishment of the result above noted that the apparatus at the distant station X should be capable of simultaneous transmission in opposite directions.

Instead of the circuit-breaker of Fig. 4, provided with annulus S, divided into sections $s'$ $s^2$, &c., from which extend wires I$w$ II$w$, &c., and S', divided into sections $§'$ $§^2$, &c., from which extend wires I$w^7$ II$w^7$, &c., and having trailers T and T', supported on and carried by shaft $a$, but insulated from each other and connected, one to $w$ and the other to $w^8$, I may use separate shafts, as shown at $a$ $a'$, Fig. 5, one carrying T across the face of the segments of S, which are interposed between the main conductor W and the wires $w$ of the several relays, and the other carrying T' across the face of S', interposed between $w^8$ and the wires $w^7$ of the respective relays, in which event I prefer to so connect $a$ and $a'$ by a belt or gear that their speed may be equal, furnishing power from one to the other.

Still another form of circuit-breaker is shown in Fig. 6, in which but one annulus is employed, one half of the sections of which are connected to wires $w^7$ of the respective relays and the other half to wires $w$. T and T', as before, are carried by $a$ and insulated from each other; but in this device their orbits are coincident and each passes over the face of S. $a$ also carries two disks $d$ $d'$—the first connected to T, but insulated from T', and the latter connected to T', but insulated from T. Brushes $t$ and $t'$ bear, respectively, against the peripheries of $d$ and $d'$, and are connected $t$ to conductor W and $t'$ to wire $w^8$. The circuits will then be substantially as heretofore described, it being borne in mind that when T passes from the half of the sections connected to wires $w$ to the half connected to wires $w^7$ and T', and vice versa, the coil of R theretofore connected to the main line will be connected to the artificial line, and vice versa, the effect being as though there were two wholly independent circuit-breakers, one in the main and one in the artificial line.

It will be readily understood that many changes in the forms of the apparatus employed may be adopted without in any way departing from the spirit of this invention.

What I claim, and desire to secure by Letters Patent, is—

1. The combination of a main-line conductor extending between two or more stations, means, substantially as described, for the simultaneous transmission of electrical impulses in opposite directions, a circuit-breaker interposed in the main line between the main-line conductor and the main-line wires of the transmitting devices and composed of two contact devices, one divided into sections connected, respectively, to said main-line wires, the other contact device thereof being connected to the main-line conductor and one of them being adapted to move across the face of the other, a similar circuit-breaker interposed in the artificial line of the transmitting devices between its artificial-line wires and the earth, with the sectional contacts respectively connected to the artificial-line wires leading from the said transmitting devices and its other contact connected to that part of the said line leading to earth, and a similar circuit-breaker at the other station, the sections of which are connected, respectively, to the instruments at that station and the single contact of which is connected to the main conductor, all substantially as set forth.

2. The combination of a main-line conductor extending between two stations, means at both stations, substantially as described, for the simultaneous transmission of electrical impulses in opposite directions, a circuit-breaker interposed in the main line between the main-line conductor and the main-line wires of the transmitting devices and composed of two contact devices, one divided into sections connected, respectively, to said main-line wires, the other connected to the main-line conductor and one of them adapted to move across the face of the other, and a similar circuit-breaker interposed in the artificial line between its artificial-line wires and the earth, with the sections of one contact connected, respectively, to said artificial-line wires and its other contact connected to the line leading to earth, all substantially as set forth.

3. The combination of two or more apparatus, substantially as set forth, for the simultaneous transmission of electrical impulses in opposite directions, each of which is provided with main-line wires adapted to connect through a circuit-breaker to and form part of the main-line conductor, and others adapted to connect through a circuit-breaker to and form part of the artificial-line conductor, a circuit-breaker one contact of which is composed of sections connected, respectively, to said main-line wires, and the other contact of which is connected to a conductor adapted for a main-line conductor, one of said contacts being also adapted, as described, to move across the face of the other, and a similar circuit-breaker, the sections of one contact of which are connected, respectively, to said artificial-line wires and the other contact of which is connected to the artificial-line conductor extending to earth, substantially as set forth.

4. The combination of two or more apparatus, substantially as set forth, for the simultaneous transmission of electrical impulses in opposite directions, each of which is provided with main-line wires adapted to connect through a circuit-breaker to and form part of the main-line conductor and others adapted to connect through a circuit-breaker to and form part of the artificial-line conductor, a circuit-breaker one contact of which is composed of sections connected, respectively, to said main-line wires, and the other contact of which is connected to a conductor adapted for a main-line conductor, one of said contacts being also adapted, as described, to move across the face of the other, and a similar circuit-breaker, the sections of one contact of which are connected, respectively, to said artificial-line wires, and the other contact of which is connected to the artificial-line conductor extending to earth, the receiving and transmitting instruments being so arranged that the transmitter connected to one section of the circuit-breaker is adjacent to and in the same division with the receiving-instrument connected to another of the sections of said circuit-breaker, all substantially as set forth.

5. The combination of a main-line conductor extending between two or more stations, means, substantially as described, for the simultaneous transmission of electrical impulses in opposite directions, a circuit-breaker interposed in the main line between the main-line conductor and the main-line wires of the transmitting devices and composed of two contact devices, one divided into sections connected, respectively, to said main-line wires, the other contact device thereof being connected to the main-line conductor, and one of them being adapted to move across the face of the other, a similar circuit-breaker interposed in the artificial line of the transmitting devices between its artificial-line wires and the earth with the sectional contacts respectively connected to the artificial-line wires leading from the said transmitting devices and its other contact connected to that part of the said line leading to earth, and a similar circuit-breaker at the other station, the sections of which are connected, respectively, to the instruments at that station and the single contact of which is connected to the main conductor, and having the receiving and transmitting instruments at the first station so arranged that the transmitters are respectively adjacent to and in the same division with the receiving-instrument connected to the respective section of the sectional contact, which is as far distant from the section connected to the adjacent transmitter as the moving contact will travel in twice the time occupied by an electric impulse in passing from one station to the other, all substantially as set forth.

Signed at New York, in the county of New York and State of New York, this 19th day of February, A. D. 1890.

EDWARD B. IVES.

Witnesses:
 FRANK B. PIERDON,
 A. G. N. VERMILYA.